(12) United States Patent
Yoshihira et al.

(10) Patent No.: US 10,476,752 B2
(45) Date of Patent: Nov. 12, 2019

(54) BLUE PRINT GRAPHS FOR FUSING OF HETEROGENEOUS ALERTS

(71) Applicant: nec laboratories america, inc., Princeton, NJ (US)

(72) Inventors: Kenji Yoshihira, Princeton Junction, NJ (US); Zhichun Li, Princeton, NJ (US); Zhengzhang Chen, Princeton Junction, NJ (US); Haifeng Chen, West Windsor, NJ (US); Guofei Jiang, Princeton, NJ (US); LuAn Tang, Pennington, NJ (US)

(73) Assignee: NEC Corporation (JP)

( * ) Notice: Subject to any disclaimer, the term of this patent is extended or adjusted under 35 U.S.C. 154(b) by 360 days.

(21) Appl. No.: 15/477,625

(22) Filed: Apr. 3, 2017

(65) Prior Publication Data

US 2017/0288979 A1  Oct. 5, 2017

Related U.S. Application Data

(63) Continuation-in-part of application No. 15/098,861, filed on Apr. 14, 2016, now abandoned.

(60) Provisional application No. 62/317,781, filed on Apr. 4, 2016.

(51) Int. Cl.
*H04L 12/24* (2006.01)
*H04L 12/26* (2006.01)
*H04L 29/06* (2006.01)

(52) U.S. Cl.
CPC ............ *H04L 41/145* (2013.01); *H04L 41/12* (2013.01); *H04L 43/045* (2013.01)

(58) Field of Classification Search
CPC ...... H04L 41/145; H04L 41/12; H04L 43/045
See application file for complete search history.

(56) References Cited

U.S. PATENT DOCUMENTS

| | | | |
|---|---|---|---|
| 2009/0228511 A1* | 9/2009 | Atkin | G06F 16/116 |
| 2013/0117848 A1* | 5/2013 | Golshan | G06F 21/566 |
| | | | 726/23 |
| 2014/0032552 A1* | 1/2014 | Cohen | H04L 41/065 |
| | | | 707/737 |
| 2014/0230061 A1* | 8/2014 | Higbee | H04L 63/1416 |
| | | | 726/24 |
| 2014/0283026 A1 | 9/2014 | Striem Amit et al. | |
| 2016/0307353 A1* | 10/2016 | Ligenza | G06T 13/20 |
| 2017/0026270 A1* | 1/2017 | Handige Shankar | H04L 41/22 |

(Continued)

OTHER PUBLICATIONS

Yizhou Sun, et al., Mining Heterogeneous Information Networks: A Structural Analysis Approach, ACM SIGKDD Explorations Newsletter archive, Dec. 2012, pp. 20-28, vol. 14 Issue 2.

(Continued)

*Primary Examiner* — Arvin Eskandarnia
*Assistant Examiner* — Chhian (Amy) Ling
(74) *Attorney, Agent, or Firm* — Joseph Kolodka (57) ABSTRACT

Methods and systems for reporting anomalous events include building a process graph that models states of process-level events in a network. A topology graph is built that models source and destination relationships between connection events in the network. A set of alerts is clustered based on the process graph and the topology graph. Clustered alerts that exceed a threshold level of trustworthiness are reported.

18 Claims, 12 Drawing Sheets

(56) References Cited

U.S. PATENT DOCUMENTS

2017/0155594 A1* 6/2017 Cook .................... G06F 9/4868

OTHER PUBLICATIONS

Ting Chen, et al., Integrating Community and Role Detection in Information Networks, in Proc of 2016 SIAM Int. Conf. on Data Mining (SFM'16), Miami, FL, May 2016.

* cited by examiner

BLUE PRINT GRAPHS FOR FUSING OF HETEROGENEOUS ALERTS

RELATED APPLICATION INFORMATION

This application claims priority to U.S. Patent Application Ser. No. 62/148,232, filed on Apr. 16, 2015, to U.S. Patent Application Ser. No. 63/317,781, filed on Apr. 4, 2016, and to U.S. patent application Ser. No. 15/098,861, filed on Apr. 14, 2016, incorporated herein by reference in their entirety.

BACKGROUND

Technical Field

The present invention relates to computer and network security and, more particularly, to integrated discovery of node community and role in such networks.

Description of the Related Art

Enterprise networks are key systems in corporations and they carry the vast majority of mission-critical information. As a result of their importance, these networks are often the targets of attack. Communications on enterprise networks are therefore frequently monitored and analyzed to detect anomalous network communication as a step toward detecting attacks.

Multiple detectors are used in enterprise networks to monitor the computers and other devices. These detectors generate different kinds of alerts based on the monitoring data. However, different detectors may generate reports with different semantics. For example, network detectors monitor the topology of network connections and generate alerts if a suspicious client connects to a stable server. Process-file detectors generate alerts if an unseen process access a sensitive file. Managing these heterogeneous alerts is a challenge.

Furthermore, a real security incident is likely to cause multiple alerts across different detectors. However, the alerts may not be reported at the same time or by the same host, representing temporal and spatial differences. In addition, due to the complexity of enterprise systems, the accuracy for a single detector can be quite low, with many alerts being false positives that put a filtering burden on the human operator. Because time is important in intrusion detection, any delay hampers the ability of the system and security personnel to respond.

Existing security systems also lack good training data to use in discriminating between normal activity and unusual activity. It is costly and error-prone to manually label a large set of reported alerts. In addition, most real alerts are unknown attacks, where the end user has no knowledge about the alert pattern and cannot define a useful model in advance.

SUMMARY

A method for reporting anomalous events includes building a process graph that models states of process-level events in a network using a processor. A topology graph is built that models source and destination relationships between connection events in the network using the processor. A set of alerts is clustered based on the process graph and the topology graph. Clustered alerts that exceed a threshold level of trustworthiness are reported.

A system for reporting anomalous events includes a blue print update module that has a processor configured to build a process graph that models states of process-level events in a network and to build a topology graph that models source and destination relationships between connection events in the network. A clustering module is configured to cluster a set of alerts based on the process graph and the topology graph. A user interface is configured to report clustered alerts that exceed a threshold level of trustworthiness.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, the present embodiments detect provide alert fusion and management using a graph-based alert fusion engine that integrates alerts in a large security system. The present embodiments employ a blue print graph model that includes two kinds of blue print graphs: a topology graph records the network connection state among hosts in an enterprise and a process graph records the relationship between a process and its objects (e.g., files, another process, or an internet socket). Both graphs are constructed via streaming data and are maintained dynamically.

When a new alert is reported, the present embodiments attempt to cluster the new alert with existing recent alerts based on the blue print graph information. Next, the present embodiments compute a trustworthiness score for each alert and ranks the alerts based on the score. The present embodiments then filter out false alerts and perform a security management action responsive to the reports.

The present embodiments thereby integrate heterogeneous alerts, having different semantics and coming from different kinds of detectors, in real time and can be operated without any pre-defined models or training data sets. Alerts are integrated in a streaming fashion, with alerts being categorized and assessed as they arrive. The present embodiments also reduce the false alert rate and increase the accuracy in intrusion/anomaly detection tasks.

Figure 1:
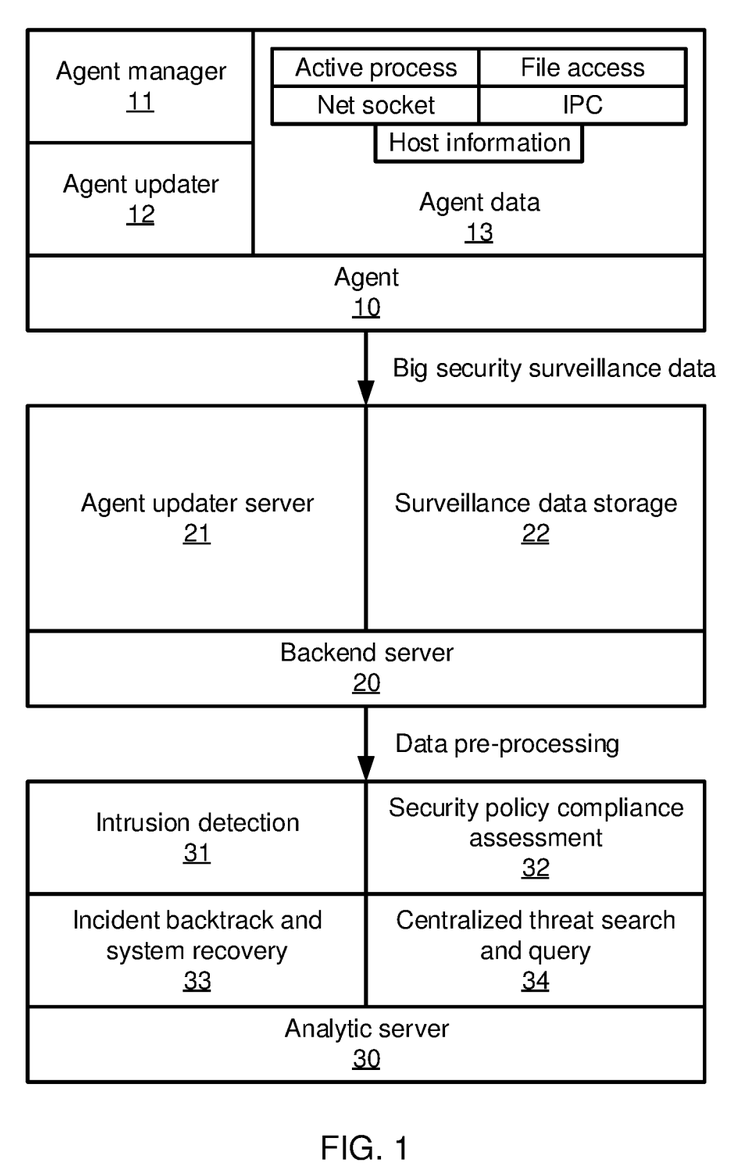
FIG. 1 is a block/flow diagram directed to an automatic security intelligence system architecture in accordance with the present principles.

Referring now in detail to the figures in which like numerals represent the same or similar elements and initially to FIG. 1, an automatic security intelligence system (ASI) architecture is shown. The ASI system includes three major components: an agent 10 is installed in each machine of an enterprise network to collect operational data; backend servers 200 receive data from the agents 10, pre-process the data, and sends the pre-processed data to an analysis server 30; and an analysis server 30 that runs the security application program to analyze the data.

Each agent 10 includes an agent manager 11, an agent updater 12, and agent data 13, which in turn may include information regarding active processes, file access, net sockets, number of instructions per cycle, and host information. The backend server 20 includes an agent updater server 21 and surveillance data storage. Analysis server 30 includes intrusion detection 31, security policy compliance assessment 32, incident backtrack and system recovery 33, and centralized threat search and query 34.

Figure 2:
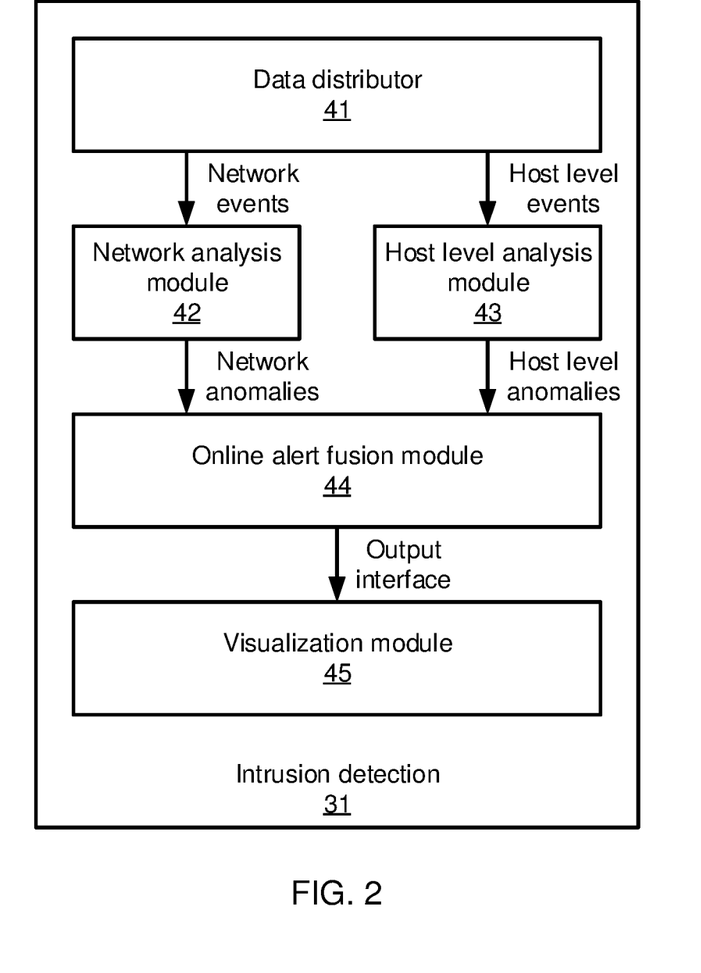
FIG. 2 is a block/flow diagram directed to an intrusion detection engine architecture in accordance with the present principles.

Referring now to FIG. 2, additional detail on intrusion detection 31 is shown. There are five modules in an intrusion detection engine: a data distributor 41 that receives the data from backend server 20 and distributes the corresponding to network level module 42 and host level module 43; network analysis module 42 that processes the network communications (including TCP and UDP) and detects abnormal communication events; host level analysis module 43 that processes host level events, including user-to-process events, process-to-file events, and user-to-registry events; online alert fusion module 44 that integrates network level anomalies and host level anomalies and refines the results for trustworthy intrusion events; and visualization module 45 that outputs the detection results to end users.

Figure 3:
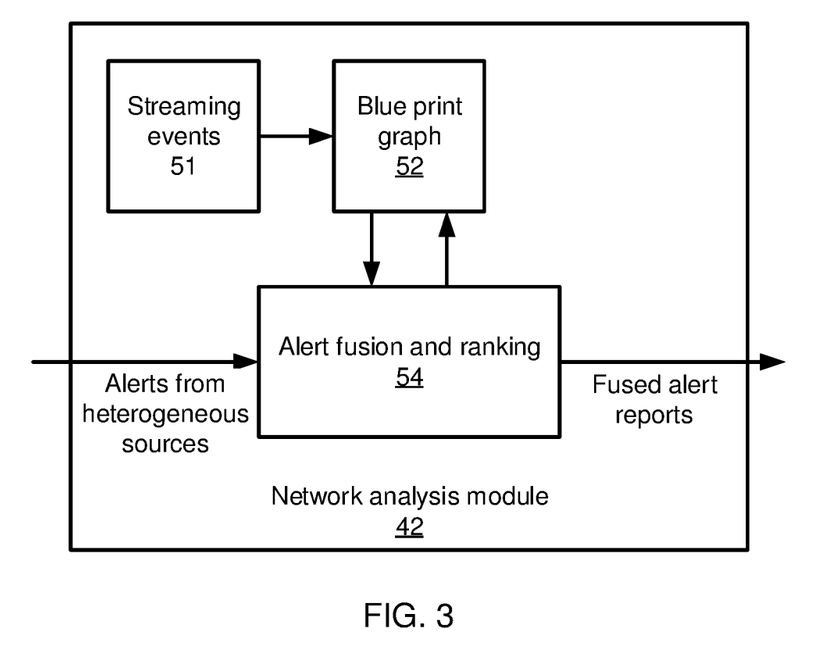
FIG. 3 is a block/flow diagram directed to a network analysis module architecture.

Referring now to FIG. 3, additional detail on network analysis module 42 is shown. The network analysis module 42 includes at least two major components: a blue print graphs 52 that are heterogeneous graphs constructed from streaming events 51 of the communications in the enterprise network, with the nodes of the graph representing machines on the enterprise network and edges representing the normal communication patterns among the nodes; and an online alert fusion and ranking module 54 that takes alerts from a variety of heterogeneous sources input, conducts analysis based on the blueprint graphs, and outputs trustworthy alert reports. The blue print graphs 52 include, in particular, a topology graph and a process graph. The topology graph may also be used by network analysis module 42 for online anomaly detection.

ASI agents 10 are installed on the hosts of the enterprise network and collect all network connection events for analysis by the analytic server 30. The agent 10 may be a lightweight piece of software to reduce the workload and maintain privacy, such that the agent 10 does not collect information on the content and traffic size of network connections. An exemplary network event e includes the following information as a 7-tuple: e=<src-ip, src-port, dst-ip, dst-port, connecting-process, protocol-num, timestamp>. The terms src-ip and src-port refer to the IP address and port of the source host for a network event, the terms dst-ip and dst-port refer to the IP address and port of the destination host, connecting-process is the process that initializes the connection, protocol-num indicates the protocol of the connection, and timestamp records the connection time.

Table 1 shows an exemplary list of network event samples from a period of time beginning at 11:30 AM and ending at 12:05 PM on Feb. 29, 2016. The network events can be classified into two categories based on the dst-ip. If the dst-ip is in the range of the local network's IP addresses (e.g., 10.15.xx.xx), then the network event can be considered an inside connection between two hosts of the network. If the dst-ip is not in the network's range, it can be considered an outside connection between an internal host and an external host. In the table, $e_1$, $e_3$, $e_5$, and $e_6$ are inside connections and $e_2$ and $e_4$ are outside connections.

TABLE 1

| Event | src-ip | src-port | dst-ip | dst-port | process | Pr | time stamp |
|---|---|---|---|---|---|---|---|
| e1 | 10.15.165.26 | 1982 | 10.15.165.226 | 445 | ntoskrnl.exe | 17 | 11:30:12 |
| e2 | 10.15.165.32 | 1672 | 74.125.228.17 | 80 | chrome.exe | 6 | 11:35:09 |
| e3 | 10.15.165.40 | 1823 | 10.15.165.235 | 445 | ntoskrnl.exe | 17 | 11:40:56 |
| e4 | 10.15.165.27 | 621 | 101.125.228.17 | 80 | chrome.exe | 6 | 11:52:19 |
| e5 | 10.15.165.28 | 8203 | 10.15.165.226 | 445 | ntoskrnl.exe | 17 | 12:02:09 |
| e6 | 10.15.165.41 | 7625 | 10.15.165.235 | 445 | ntoskrnl.exe | 17 | 12:05:23 |

The dst-ip values of the outside connections can be very diverse, but the dst-ip values of inside connections are regular and follow a pattern. For examples, the hosts belonging to the same group all connect to the private servers of the group and rarely connect to other groups' private servers. Based on this observation, the present embodiments model normal event states using the blue print graphs 52. The topology graph in particular is used to model the source and destination relationship of the connection events inside the network.

The topology blue print graph is defined as $G_t$=<V, E>, where V is the node set of hosts inside the enterprise network and E is the set of edges between said nodes. A host node v is defined as a 3-tuple, v=<host-id, ip, last-connection-time>, and an edge l is defined as a 4-tuple, l=<edge-id, src-ip, dst-ip, last-connection-time>. The term last-connection-time records the timestamp of the latest network connection on the node/edge. This measurement is used to update the blue print graphs 52. If a node/edge has no connection event for a predetermined period of time (e.g., two months), the system will remove such nodes/edges to keep the blue print graphs 52 up to date.

If there is a new network connection between a pair of hosts inside the network, an edge is added to the topology graph between the two host nodes. The last-connection-time of both nodes and edges are updated as the timestamp of the connection event. The topology graph need not store the total count of connection events between a pair of nodes. Because the ASI agent 10 does not monitor the contents and traffic of the network connections, the total count of the connections is not meaningful and can even be misleading. In practical applications, processes may initialize thousands of network connection events in one second via the same edge. A large number in the total count would not indicate high traffic along that edge.

Figure 4:
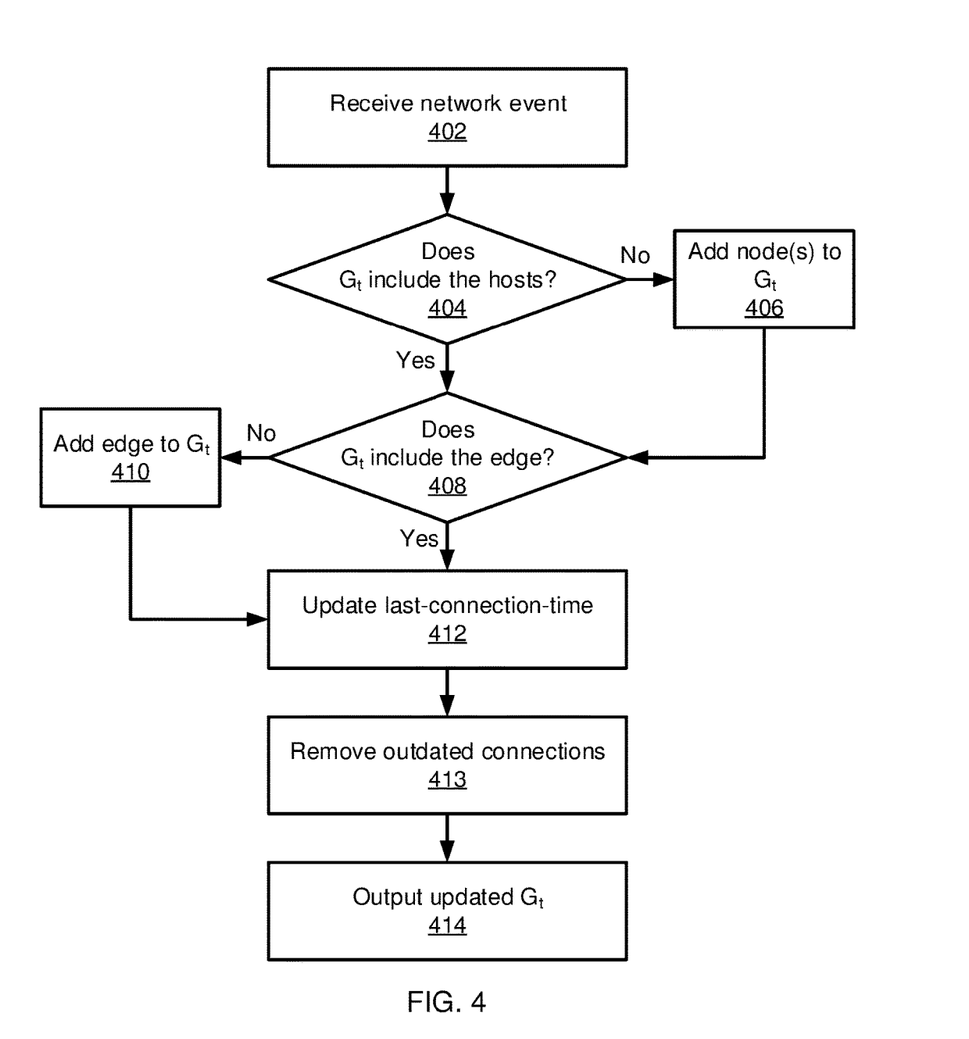
FIG. 4 is a block/flow diagram of a method of building a topology blue print graph in accordance with one embodiment of the present invention.

Referring now to FIG. 4, a method of updating a topology graph is shown. Block 402 receives a new network connection event from one of the ASI agents 10. Block 404 determines whether the topology graph already includes both the source and destination host nodes and block 406 adds these nodes to the topology graph if they are not already present. Block 408 determines whether the topology graph already includes an edge between the source and destination nodes and block 410 adds the edge to the topology graph if it is not already present. Block 412 updates the last-connection-time value for any affected nodes and edges and block 413 removes any nodes or edges that have a last-connection-time that is far enough in the past that it exceeds a predetermined maximum lifetime. Block 414 outputs the updated topology graph.

This same process is used to initially construct the topology graph and to keep the topology graph updated as new connection events arrive. The blue print graphs 52 can be saved in non-volatile storage and may also be loaded by different analysis engines to take advantage of the up-to-date topology information. For example, users may construct blue print graphs 52 from one enterprise network and then load the saved blue print graphs 52 on another enterprise network. The topology graph will automatically be updated during operation and does not need user intervention to provide any particular information about the network, making the present embodiments appropriate for rapid deployment in real networks.

In addition to network connection events, the ASI agents 10 collect process-level events, such as when a process accesses a file, opens a socket, or forks another process. A process-level event e is a 5-tuple, e=<host-id, user-id, process, object, timestamp>, where host-id indicates the host where the agent 10 is installed, user-id identifies the user who runs the process, timestamp records the event time, process is the subject of the event, and object is the object of the event. The object can be, e.g., a file, another process, or a socket that contains connection information. According to the object type, the process-level events can be classified into three categories: the process-file events, the process-socket events, and the process-process events.

Table 2 shows an exemplary list of process-level events between the time 11:30 AM and 12:05 PM on a given date. The IP address is used as the identifier for hosts. In the following, events $e_1$ and $e_5$ are process-file events, $e_3$ and $e_4$ are process-socket events, and $e_2$ is a process-process event.

TABLE 2

| Event | host-id | user-id | process | object | Time |
|---|---|---|---|---|---|
| $e_1$ | 10.15.165.52 | system | ntoskrnl.exe | File | 11:30:12 |
| $e_2$ | 10.15.165.33 | root | explorer.exe | Process | 11:35:09 |
| $e_3$ | 10.15.165.22 | user-1 | firefox.exe | Socket | 11:40:56 |
| $e_4$ | 10.15.165.22 | user-1 | chrome.exe | Socket | 11:52:19 |
| $e_5$ | 10.15.165.38 | root | spoolsv.exe | File | 12:02:09 |

The processes and their objects also follow certain patterns. For example, some processes only access a set of files located in a particular folder, while other processes only connect to the socket of specific destinations. Based on this observation, the process graph models the normal states of process-level events in an enterprise network.

The process blue print graph is defined as $G_p=<V, E>$, where V is a node set and E is an edge set. A node v in V is defined as a 3-tuple, v=<node-id, type, last-event-time>, and an edge l is defined as a 4-tuple, l=<edge-id, src-node-id, dst-node-id, last-event-time>. There are three types of nodes in the process graph, including process nodes, file nodes, and socket nodes. The node-id value represents the identity information. For example, if the node is a file, the node-id stores the file path. The last-event-time value records the timestamp of the latest event on the node/edge. This measurement is used to remove outdated nodes and edges. The process graph is built for each host. When an agent 10 is installed on the host, it continually sends all process-level events that occur on the host and the system constructs the process graph as soon as the first event is received from that host.

Figure 5:
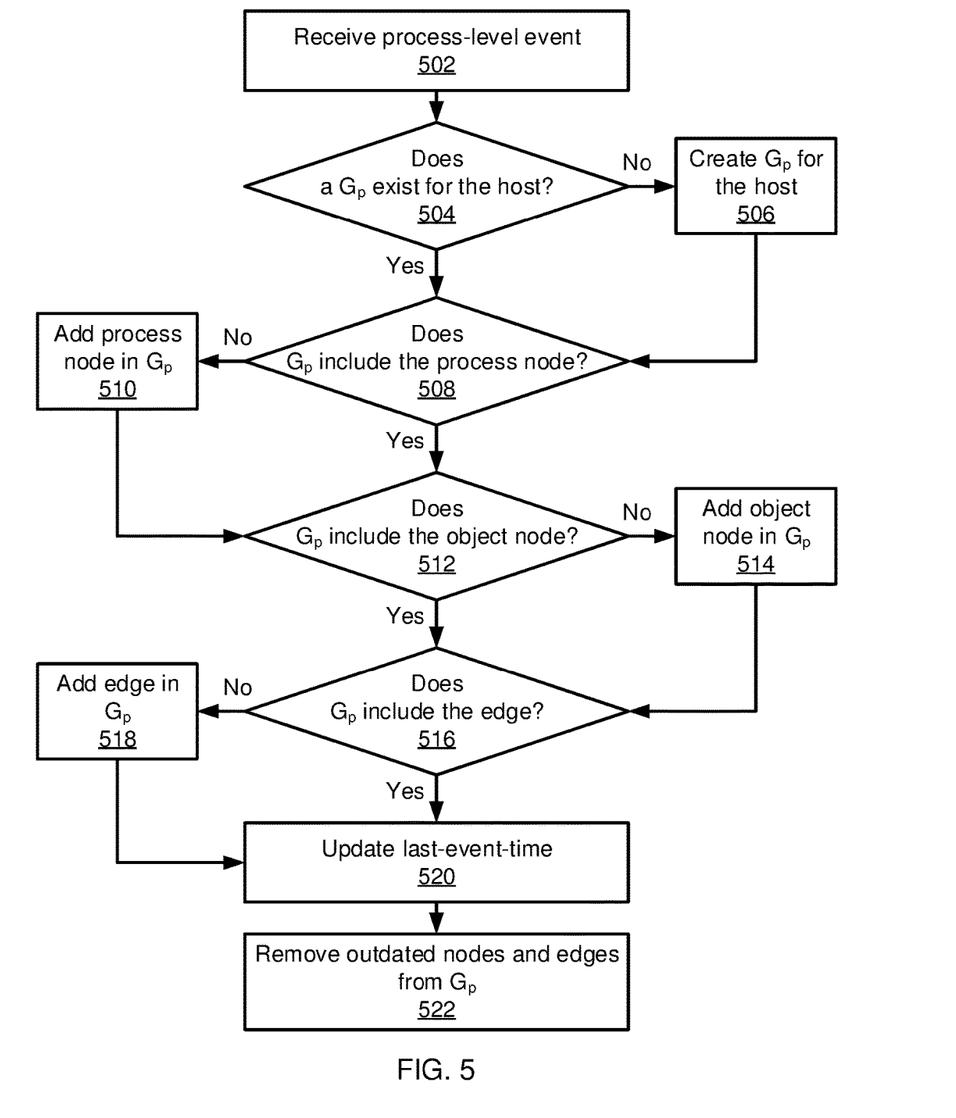
FIG. 5 is a block/flow diagram of a method of building a process blue print graph in accordance with one embodiment of the present invention.

Referring now to FIG. 5, a method of building and updating a process graph is shown. Block 502 receives a process-level event p. Block 504 determines whether the host of the process-level event already has a process graph $G_p$ associated with it. If not, block 506 creates a new process graph for the host. Block 508 determines whether $G_p$ includes a node for the process identified by the process-level event. If not, block 510 adds a new process node to $G_p$. Block 512 determines whether $G_p$ includes a node for the process's object. If not, block 514 adds an appropriate object node to $G_p$. Block 516 determines whether $G_p$ includes an edge for the process event. If not, block 518 adds such an edge to $G_p$.

The topology graph $G_t$ and the process graph $G_p$ together represent the blue print graphs 52. These blue print graph models are used by network analysis module 42 and host level analysis module 43 to detect abnormal events. In addition, the blue print graphs 52 are also used by only alert fusion module 44, which maintains a set of historical alert candidates in memory. The historical alert candidates are previous alerts that have been reported to the alert fusion system but are not output due to low trustworthiness. The fusing module 44 takes both newly reported alerts and historical alert candidates as input.

Figure 6:
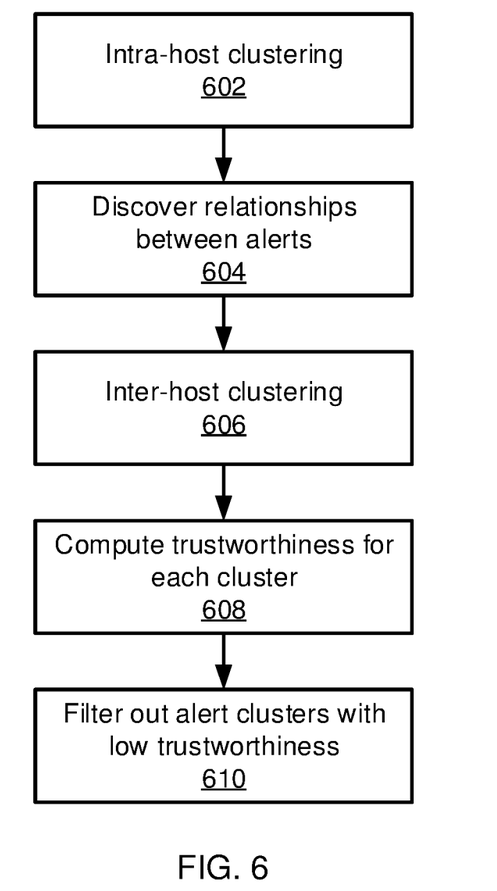
FIG. 6 is a block/flow diagram of a method of clustering alerts in accordance with one embodiment of the present invention.

Referring now to FIG. 6, a method for alert fusion is shown. Block 602 performs intra-host clustering based on graph information. In this step, block 602 clusters related alerts reported by each individual host. Intra-host clustering makes use of a distance measurement between two alerts. For two process events, $e_1=<h_1, u_1, p_1, o_1, t_1>$ and $e_2=<h_2, u_2, p_2, o_2, t_2>$, $h_1$ and $h_2$ are host-ids, $u_1$ and $u_2$ are user-ids, $p_1$ and $p_2$ are processes for the events, $o_1$ and $o_2$ are the objects, and $t_1$ and $t_2$ are event timestamps. The process distance between $e_1$ and $e_2$ is defined by the equation below, where $SP(p_1 \rightarrow p_2 | G_p)$ is the shortest path from $p_1$ to $p_2$ in the process graph $G_p$:

$$dist_p(e_1, e_2) = \begin{cases} \infty & \text{if } h_1 \neq h_2 \\ 0 & \text{if } h_1 = h_2 \text{ and } p_1 = p_2 \\ |SP(p_1 \to p_2 | G_p)| & \text{if } h_1 = h_2 \text{ and } p_1 \neq p_2 \end{cases}$$

This equation has three different conditions: 1. If $e_1$ and $e_2$ are from different hosts, the distance is infinite; 2. If $e_1$ and $e_2$ are from the same host and the same process, the distance is zero; and 3. If $e_1$ and $e_2$ are from the same host and different processes, the process distance is the length of the shortest path from $p_1$ to $p_2$. The details of intra-host clustering will be described in greater detail below.

Block 604 discovers the relationships between alerts. Besides explicit relationships, the alerts may also have hidden relationships. For example, if the process distance between two alerts is large, but the alerts are reported in a short time period, or if the user-id of both alerts is the same, then the alerts may be related.

For two process events, $e_1 = \langle h_1, u_1, p_1, o_1, t_1 \rangle$ and $e_2 = \langle h_2, u_2, p_2, o_2, t_2 \rangle$ that are reported as alerts, $e_1$ and $e_2$ may be defined as having a hidden relationship if and only if they satisfy the following conditions:

$$h_1 = h_2$$

$$u_1 = u_2$$

$$|t_1 - t_2| < \delta_1$$

where $\delta_1$ is a time period threshold. Thus, hidden relationships are designated for alerts that are on the same host, with the processes of the alerts being run by the same user during a short time period. Additional details on clustering based on hidden relationships is provided below.

In practical scenarios, many intrusions or malware incidents will occur across multiple hosts. Hence block 606 performs inter-host clustering to integrate the alerts from different hosts. For two process events, $e_1 = \langle h_1, u_1, p_1, o_1, t_1 \rangle$ and $e_2 = \langle h_2, u_2, p_2, o_2, t_2 \rangle$ that are reported as alerts, $e_1$ and $e_2$ may be designated as having an inter-host relationship if and only if $h_1 \neq h_2$, if $|t_1 - t_2| < \delta_t$, if there is an edge between $h_1$ and $h_2$ in the topology $G_t$, and if $|\text{last\_connection\_time}(l) - t_1| < \delta_t$ or $|\text{last\_connection\_time}(l) - t_2| < \delta_t$.

An inter-host relationship does not require both alerts to have the same host-id or user-id. However, such alerts should be reported in a short period of time and the hosts of the alerts should be connected in the topology graph. In addition, the latest connection timestamp of the edge between the two hosts should be close to the alert timestamp, such that the two hosts have network connections in the time period when the alerts are reported. Additional detail regarding inter-host relationship is provided below.

Figure 10:
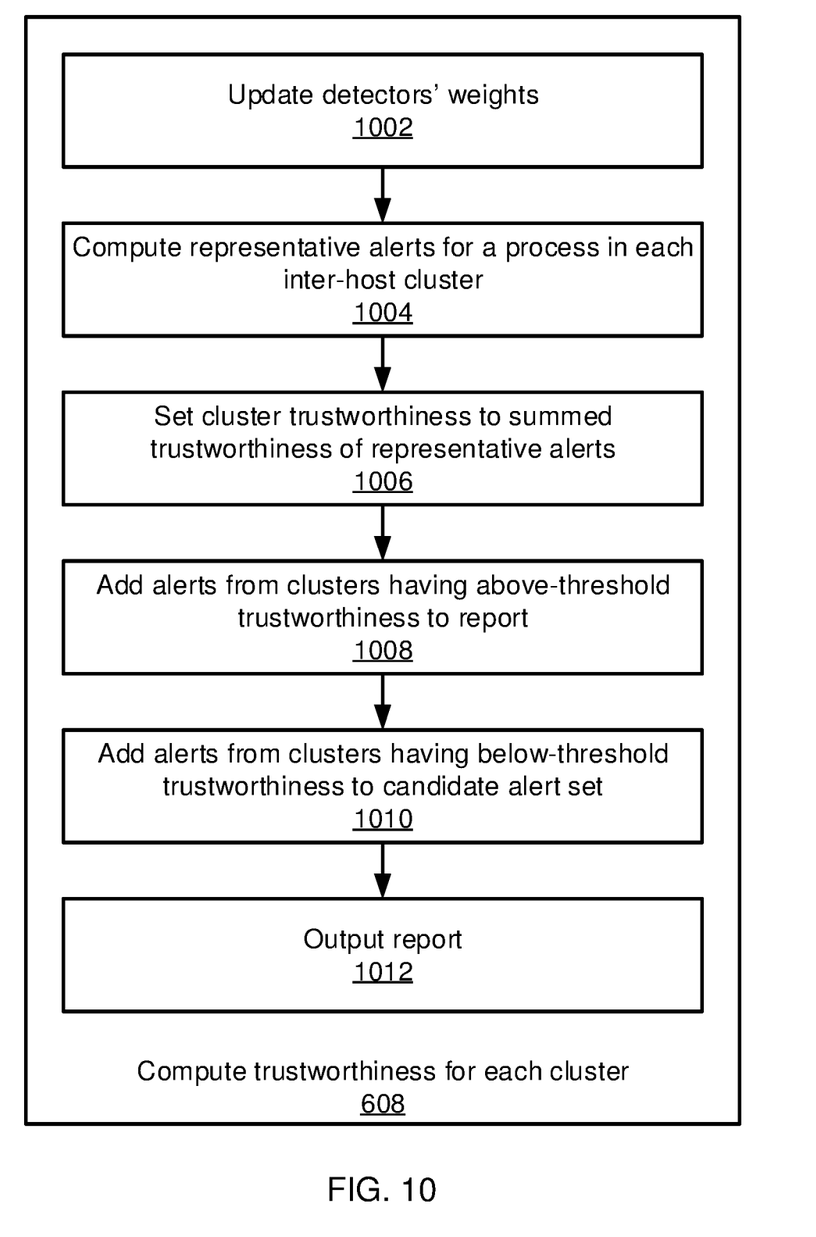
FIG. 10 is a block/flow diagram of a method for computing the trustworthiness of a cluster of alerts in accordance with one embodiment of the present invention.

After generating inter-host clusters, block 608 computes trustworthiness for each cluster. Every alert in each inter-host cluster has an abnormality score when reported by the detectors in network analysis module 42 or host-level analysis module 43. The trustworthiness of an alert e, reported by detector $d_i$ is determined as:

$$\sigma(e) = w_i \cdot \text{score}(e)$$

where $w_i$ is the trustworthiness weight of detector $d_i$ and score$\epsilon$ is the reported abnormality score.

The value range of the detector's weight $w_i$ is [0,1]. This parameter is computed in a feedback look, where the weight is first initialized for every detector as 1. If a user deems a particular alert to be a "false alarm," that fact can be recorded. The weight of $w_i$ is calculated as:

$$w_i = \frac{|E_i^{false}|}{|E_i|}$$

where $|E_i^{false}|$ is the number of false alerts reported by the detector $d_i$ and where $|E_i|$ is the total number of alerts from $d_i$. The weights of the detectors are updated before computing the trustworthiness of the inter-host clusters.

In computing the trustworthiness of an inter-host cluster, c is defined to be an inter-host cluster; p is defined to be a process, where c has at least one alert with process p; and $e_p$ is a representative alert of p in cluster c. The alert $e_p$ is considered representative if there does not exist another alert $e_i$ in c where the process of $e_i$ is also p and where $\sigma(e_i) > \sigma(e)$. The representative alert of the process is therefore the alert with the highest alert trustworthiness. The cluster trustworthiness is defined as:

$$\sigma(c) = \sum_{p \in P} \sigma(e_p)$$

where P is the set of all processes that are related to the alerts in c. The trustworthiness of an inter-host cluster is the sum of all processes' representative alert trustworthiness. A large cluster that includes many processes would therefore have a relatively high trustworthiness.

Block 610 filters the clusters according to a threshold, comparing each cluster's trustworthiness score to that threshold. If a cluster's trustworthiness score exceeds the thereshold, then its alerts are reported.

Figure 7:
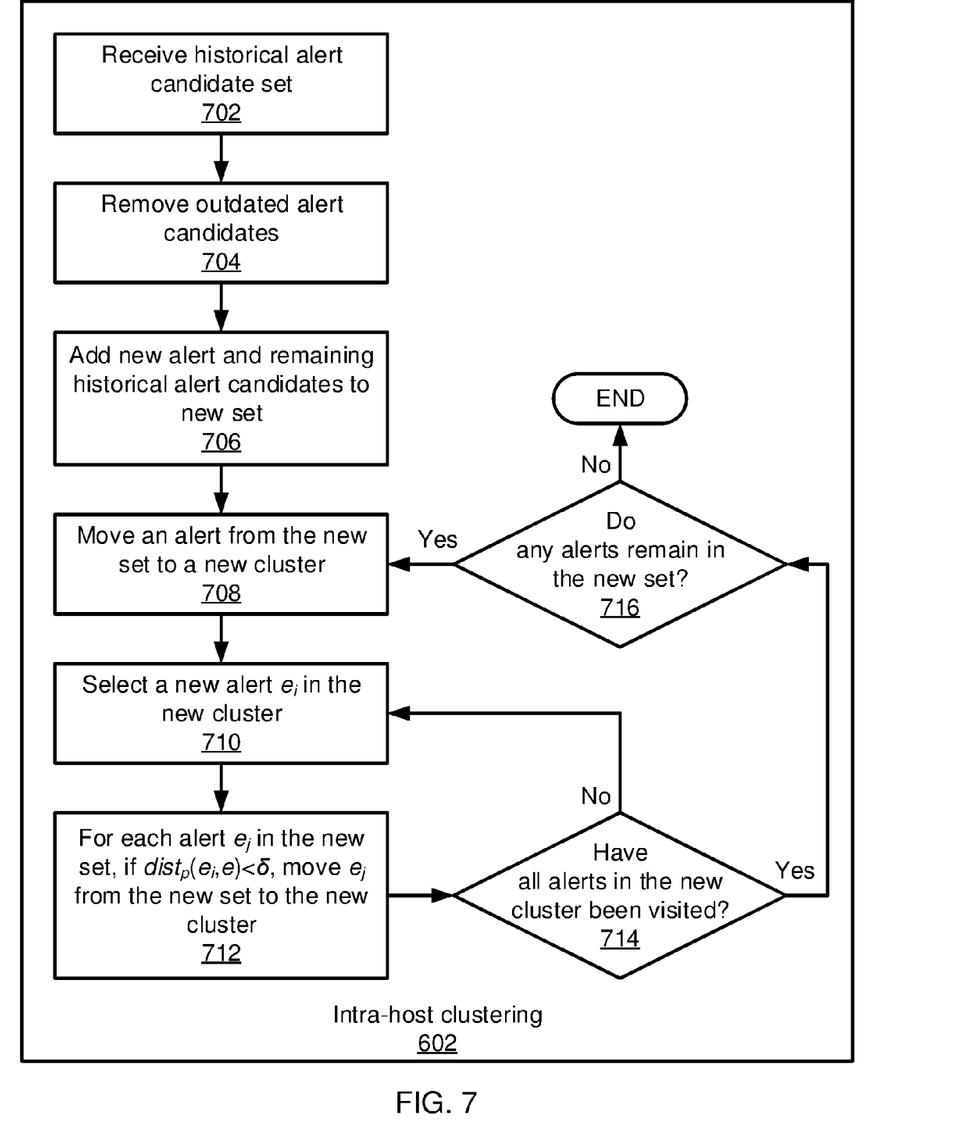
FIG. 7 is a block/flow diagram of a method of intra-host alert clustering in accordance with one embodiment of the present invention.

Referring now to FIG. 7, additional detail on intra-host clustering in block 602 is shown. Block 702 receives a set of historical alert candidates $E_h$. Block 704 removes any alerts from $E_h$ that are outdated (e.g., that were issued more than a threshold time in the past). Block 706 adds a new alert $e_{new}$ and all of the remaining historical candidates $E_h$ to a new set e.

Block 708 selects an alert e from the new set E (this may be performed randomly) and moves the selected alert e to a newly initialized cluster c. A loop begins, where block 710 selects a new alert $e_i$ from within the new cluster c. Block 712 checks every alert $e_j$ remaining in the new set E and determines $dist_p(e_i, e_j)$. If $dist_p(e_i, e_j)$ is less than the process distance threshold $\delta$, block 712 moves $e_j$ from the new set E to the new cluster c.

Block 714 determines whether all of the alerts in the new cluster c have been visited. If not, processing returns to block 710 and a new, unvisited alert $e_i$ is selected from the cluster c. If all of the alerts in c have been visited, processing returns to block 708, where another new cluster is initialized and an initial alert is moved from the new set E to the new cluster. This process continues until block 716 determines that there are no alerts remaining in the new set E.

Figure 8:
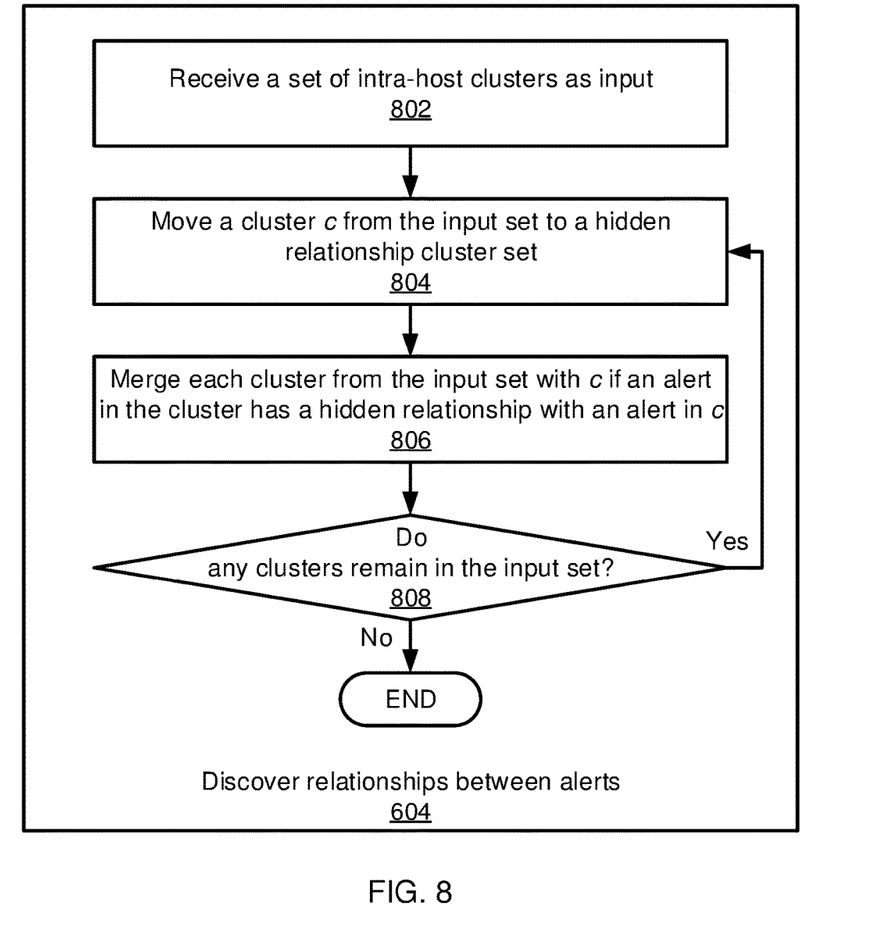
FIG. 8 is a block/flow diagram of a method of discovering hidden relationships between alerts in accordance with one embodiment of the present invention.

Referring now to FIG. 8, a method of performing clustering based on hidden relationships is shown as a part of the discovery of relationships between alerts in block 604. Block 802 receives as an input a set of intra-host clusters. Block 804 begins by moving a cluster from the input set to a set of clusters that include hidden relationships. Block 806 considers every alert in the moved cluster c to determine if any such alert shares a hidden relationship with an alert in any cluster still in the input set. If so, the cluster is merged with c and removed from the input set. Block 808 then determines if any clusters remain in the input set. If so, processing returns to block 804 where a new cluster is moved from the input set to the hidden relationship cluster set. If not, the hidden relationship cluster set is output.

Figure 9:
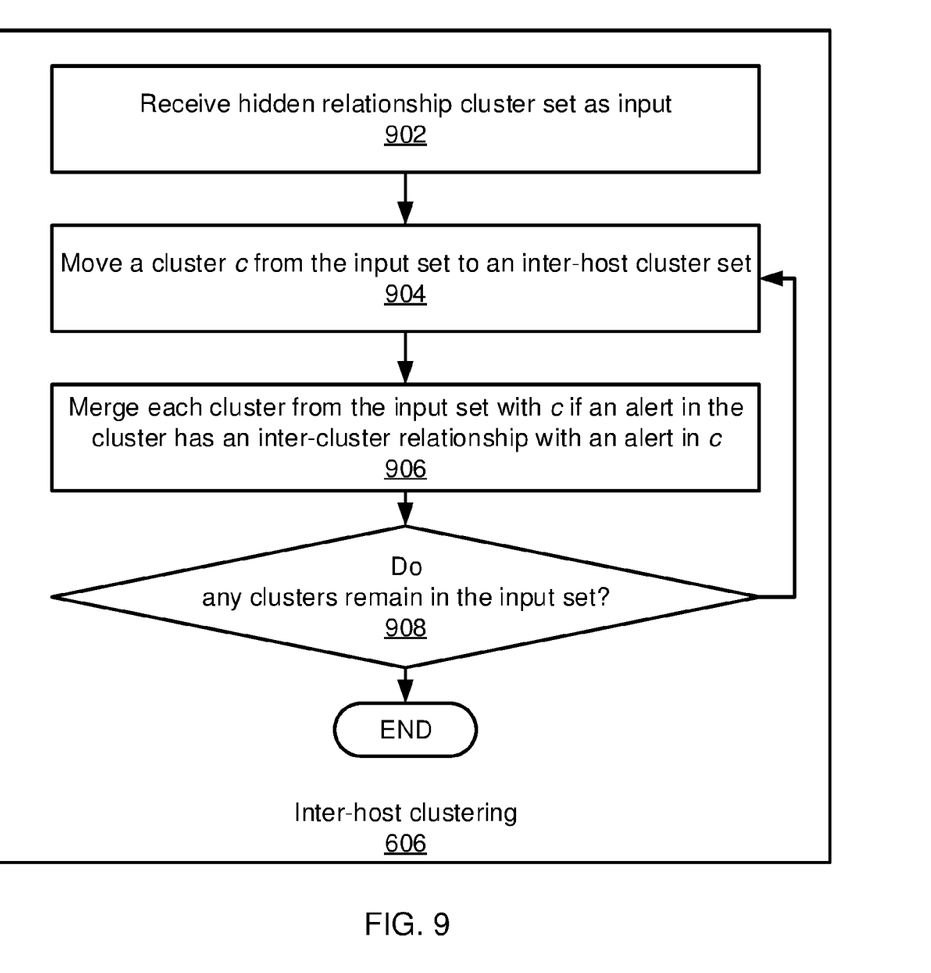
FIG. 9 is a block/flow diagram of a method of inter-host alert clustering in accordance with one embodiment of the present invention.

Referring now to FIG. 9, a method of performing inter-host clustering in block 606 is shown. Block 902 receives the hidden relationship cluster set as an input. Block 904 moves a cluster c from the input set to an inter-host cluster set. Block 906 considers every alert in the moved cluster c to determine if any such alert shares an inter-cluster relationship with an alert in any cluster still in the input set. If so, block 906 merges the cluster with c and removes the cluster from the input set. Block 908 then determines if any clusters remain in the input set. If so, processing returns to block 904 where a new cluster is moved from the input set to the inter-host cluster set. If not, the inter-host cluster set is output.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
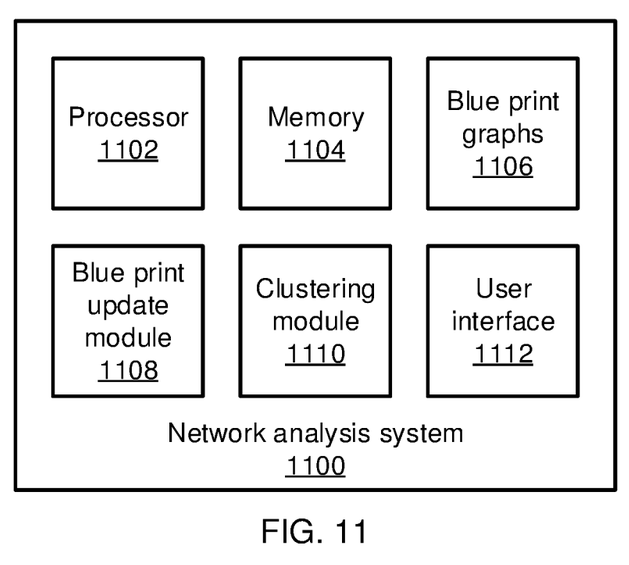
FIG. 11 is a block diagram of a network analysis system in accordance with one embodiment of the present invention.

Referring now to FIG. 11, a network analysis system 1100 is shown. The network analysis system includes a hardware processor 1102 and a memory 1104. A user interface 1100 provides a visual, textual, and/or audio interface by which a user receives network alerts, including fused alerts. In addition, the network analysis system 1100 includes one or more functional modules that may, in some embodiments, be implemented as software that is stored in the memory 1104 and executed by hardware processor 1102. In other embodiments, the functional module may be implemented as one or more discrete hardware components in the form of, e.g., application specific integrated chips or field programmable gate arrays.

A blue print graph update module 1108 builds and updates blue print graphs 1106 as events arrive. Based on the blue print graphs 1106, the clustering module 1110 clusters the alerts into clusters having, e.g., intra-host, inter-host, and/or hidden relationships and determines a trustworthiness of said clusters. If the trustworthiness of a cluster exceeds a threshold level, the alerts in the cluster are provided to the user through the user interface 1112.

Figure 12:
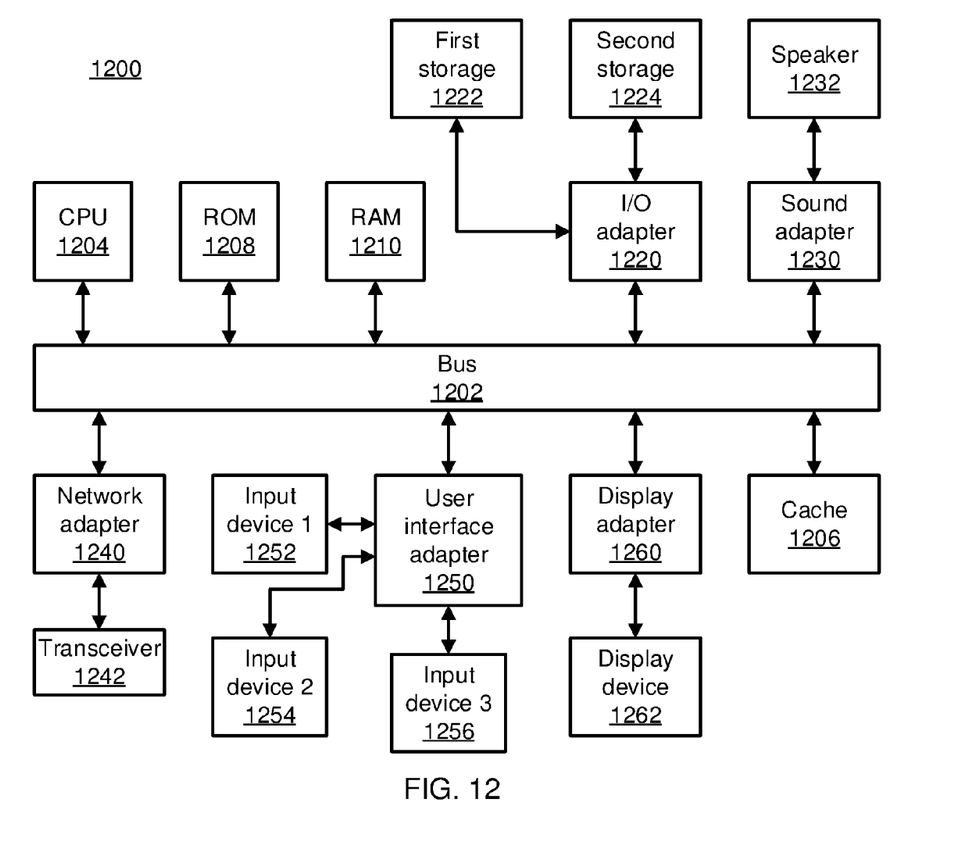
FIG. 12 is a block diagram of a processing system in accordance with one embodiment of the present invention.

Referring now to FIG. 12, an exemplary processing system 1200 is shown which may represent the network analysis system 1100. The processing system 1200 includes at least one processor (CPU) 1204 operatively coupled to other components via a system bus 1202. A cache 1206, a Read Only Memory (ROM) 1208, a Random Access Memory (RAM) 1210, an input/output (I/O) adapter 1220, a sound adapter 1230, a network adapter 1240, a user interface adapter 1250, and a display adapter 1260, are operatively coupled to the system bus 1202.

A first storage device 1222 and a second storage device 1224 are operatively coupled to system bus 1202 by the I/O adapter 1220. The storage devices 1222 and 1224 can be any of a disk storage device (e.g., a magnetic or optical disk storage device), a solid state magnetic device, and so forth. The storage devices 1222 and 1224 can be the same type of storage device or different types of storage devices.

A speaker 1232 is operatively coupled to system bus 1202 by the sound adapter 1230. A transceiver 1242 is operatively coupled to system bus 1202 by network adapter 1240. A display device 1262 is operatively coupled to system bus 1202 by display adapter 1260.

A first user input device 1252, a second user input device 1254, and a third user input device 1256 are operatively coupled to system bus 1202 by user interface adapter 1250. The user input devices 1252, 1254, and 1256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1252, 1254, and 1256 can be the same type of user input device or different types of user input devices. The user input devices 1252, 1254, and 1256 are used to input and output information to and from system 1200.

Of course, the processing system 1200 may also include other elements (not shown), as readily contemplated by one of skill in the art, as well as omit certain elements. For example, various other input devices and/or output devices can be included in processing system 1200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1200 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for reporting anomalous events, comprising:
    building a process graph that models states of process-level events in a network using a processor, wherein the nodes in the process graph including process nodes, file nodes, and socket nodes;
    building a topology graph that models source host and destination host relationships between connection events in the network using the processor;
    clustering a set of alerts based on the process graph and the topology graph; and
    reporting clustered alerts that exceed a threshold level of trustworthiness to reduce a false alert rate: and
    performing a security management action responsive to the reported clustered alerts.

2. The method of claim 1, further comprising trimming elements from the process graph and the topology graph if said elements have a last-connection-time value older than a threshold period.

3. The method of claim 1, wherein building the process graph comprises creating a new process node in the process graph if a process node does not already exist in the process graph for a received process-level event.

4. The method of claim 3, wherein building the process graph comprises creating a new object node in the process graph if an object node does not already exist in the process graph for the received process-level event.

5. The method of claim 4, wherein building the process graph comprises creating a new edge between the process node and the object node if an edge does not already exist in the process graph between the process node and the object node.

6. The method of claim 5, wherein building the process graph comprises updating a last-event-time value for the process node and the object node to a timestamp in the received process-level event.

7. The method of claim 1, wherein building the topology graph comprises creating a new host node in the topology graph corresponding to a host node that does not already exist in the topology graph from a received network event.

8. The method of claim 7, wherein building the topology graph comprises creating a new edge between host nodes indicated by the received network event if an edge does not already exist in the topology graph between said hosts.

9. The method of claim 8, wherein building the topology graph comprises updating a last-event-time value for the hosts indicated by the received network event to a timestamp in the received network event.

10. A system for reporting anomalous events, comprising:
    a blue print update module comprising a processor configured to build a process graph that models states of process-level events in a network and to build a topology graph that models source host and destination host relationships between connection events in the network, wherein the nodes in the process graph including process nodes, file nodes, and socket nodes;
    a clustering module configured to cluster a set of alerts based on the process graph and the topology graph; and
    a user interface configured to report clustered alerts that exceed a threshold level of trustworthiness to reduce a false alert rate; and
    a system recovery module configured to perform a security management action responsive to the reported clustered alerts.

11. The system of claim 10, wherein the blue print update module is further configured to trim elements from the process graph and the topology graph if said elements have a last-connection-time value older than a threshold period.

12. The system of claim 10, wherein the blue print update module is further configured to create a new process node in the process graph if a process node does not already exist in the process graph for a received process-level event.

13. The system of claim 12, wherein the blue print update module is further configured to create a new object node in the process graph if an object node does not already exist in the process graph for the received process-level event.

14. The system of claim 13, wherein the blue print update module is further configured to create a new edge between the process node and the object node if an edge does not already exist in the process graph between the process node and the object node.

15. The system of claim 14, wherein the blue print update module is further configured to update a last-event-time value for the process node and the object node to a timestamp in the received process-level event.

16. The system of claim 10, wherein the blue print update module is further configured to create a new host node in the topology graph corresponding to a host node that does not already exist in the topology graph from a received network event.

17. The system of claim 16, wherein the blue print update module is further configured to create a new edge between host nodes indicated by the received network event if an edge does not already exist in the topology graph between said hosts.

18. The system of claim 17, wherein the blue print update module is further configured to update a last-event-time value for the hosts indicated by the received network event to a timestamp in the received network event.

* * * * *